(12) United States Patent
Peng et al.

(10) Patent No.: US 10,870,541 B2
(45) Date of Patent: Dec. 22, 2020

(54) LOGISTICS TROLLEY AND PRODUCTION LINE USING THE SAME

(71) Applicants: BOE TECHNOLOGY GROUP CO., LTD., Beijing (CN); HEFEI BOE DISPLAY TECHNOLOGY CO., LTD., Anhui (CN)

(72) Inventors: Fan Peng, Beijing (CN); Wei Min, Beijing (CN); Haibin Liu, Beijing (CN); Fangqing Li, Beijing (CN); Yong Sun, Beijing (CN); Baoyong Nie, Beijing (CN); Zhiyu Qian, Beijing (CN)

(73) Assignees: BOE TECHNOLOGY GROUP CO., LTD., Beijing (CN); HEFEI BOE DISPLAY TECHNOLOGY CO., LTD., Anhui (CN)

( * ) Notice: Subject to any disclaimer, the term of this patent is extended or adjusted under 35 U.S.C. 154(b) by 405 days.

(21) Appl. No.: 15/755,423

(22) PCT Filed: Aug. 16, 2017

(86) PCT No.: PCT/CN2017/097636
§ 371 (c)(1),
(2) Date: Feb. 26, 2018

(87) PCT Pub. No.: WO2018/086396
PCT Pub. Date: May 17, 2018

(65) Prior Publication Data
US 2020/0231388 A1    Jul. 23, 2020

(30) Foreign Application Priority Data
Nov. 8, 2016 (CN) .......................... 2016 1 0979368

(51) Int. Cl.
*B65G 35/06* (2006.01)
*B62B 3/00* (2006.01)

(52) U.S. Cl.
CPC .............. *B65G 35/063* (2013.01); *B62B 3/00* (2013.01)

(58) Field of Classification Search
CPC .......... B65G 35/00; B65G 35/063; B62B 3/00
(Continued)

(56) References Cited

U.S. PATENT DOCUMENTS 1,498,095 A    6/1924   Hayes
2,127,972 A *  8/1938   Hutchinson .......... B65G 63/065
                                                  280/43.2
(Continued)

FOREIGN PATENT DOCUMENTS

CN      101665189 A    3/2010
CN      201580794 U    9/2010
(Continued)

OTHER PUBLICATIONS

China Second Office Action, Application No. 201610979368.6, dated Jun. 5, 2018, 15 pps.: with English translation.
(Continued)

*Primary Examiner* — James R Bidwell
(74) *Attorney, Agent, or Firm* — Armstrong Teasdale LLP

(57) ABSTRACT

The embodiments of the present disclosure provide a logistics trolley, including a carrier for carrying a material, a body for supporting the carrier, and wheels disposed below the bottom of the trolley body, wherein the carrier has an extension length in a horizontal direction greater than an extension length of the trolley body in a horizontal direction, the carrier includes a conveying mechanism for conveying the material.

8 Claims, 3 Drawing Sheets

(58) Field of Classification Search
USPC .......................................... 198/861.1, 860.1
See application file for complete search history.

(56) References Cited

U.S. PATENT DOCUMENTS

| | | | | |
|---|---|---|---|---|
| 2,631,715 | A * | 3/1953 | Vickers | B65G 21/14 198/812 |
| 3,329,253 | A * | 7/1967 | Tashman | B65G 23/08 198/496 |
| 3,452,632 | A * | 7/1969 | Brolund | B23D 35/008 83/549 |
| 5,713,452 | A * | 2/1998 | Halsted | B65G 23/44 198/370.07 |
| 6,772,575 | B2 * | 8/2004 | Limousin | B65B 53/063 198/459.5 |
| 6,955,119 | B2 * | 10/2005 | Bobren | B65B 13/06 100/18 |
| 10,633,011 | B2 * | 4/2020 | Matsumoto | B65G 47/52 |
| 2015/0144536 | A1 * | 5/2015 | Dugat | B65G 13/12 209/2 |
| 2016/0304109 | A1 * | 10/2016 | Andreas | B65G 65/00 |
| 2018/0169452 | A1 * | 6/2018 | Nessel | A62C 99/0081 |
| 2019/0084768 | A1 * | 3/2019 | Vogt | B05B 13/04 |

FOREIGN PATENT DOCUMENTS

| | | | |
|---|---|---|---|
| CN | 201801191 U | 4/2011 | |
| CN | 202863489 U | 4/2013 | |
| CN | 205169538 U | 4/2016 | |
| CN | 106627685 A | 5/2017 | |
| GB | 2419856 | * 5/2006 | ............... B62B 5/00 |

OTHER PUBLICATIONS

English translation of PCT International Search Report, Application No. PCT/CN2017/097636, dated Nov. 16, 2017, 2 pages.
PCT Written Opinion, Application No. PCT/CN2017/097636, dated Nov. 16, 2017, 6 pages.: with English translation of relevant part.
China First Office Action, Application No. 201610979368.6, dated Jan. 26, 2018, 14 pps.: with English translation.

* cited by examiner

LOGISTICS TROLLEY AND PRODUCTION LINE USING THE SAME

CROSS REFERENCE TO RELATED APPLICATIONS

This patent application is a National Stage Entry of PCT/CN2017/097636 filed on Aug. 16, 2017, which claims the benefit and priority of Chinese Patent Application No. 201610979368.6 filed on Nov. 8, 2016, the disclosures of which are incorporated herein by reference in their entirety as part of the present application.

BACKGROUND

The embodiments of the present disclosure relate to material transportation field, and in particular to a logistics trolley and a production line using such a logistics trolley to transport a material.

The logistics trolley is an important tool at production sites such as a production workshop to transport a material along the production line. However, some areas of the production site are rather narrow, so the logistics trolley in related art is too large to enter, and thus cannot transport the material.

BRIEF DESCRIPTION

The embodiments of the present disclosure provide a logistics trolley, including a carrier for carrying a material, a trolley body for supporting the carrier portion, and wheels disposed at the bottom of the trolley body, wherein the carrier has an extension length in a horizontal direction greater than an extension length of the trolley body in a horizontal direction, the carrier includes a conveying mechanism for conveying the material.

In an embodiment of the disclosure, the conveying mechanism includes a roller conveying mechanism which includes a support frame and a plurality of rollers mounted on the support frame.

In an embodiment of the present embodiment, the logistics trolley further includes a drive motor which is arranged to drive the roller conveying mechanism to convey the material.

In an embodiment of the present disclosure, the conveying mechanism includes a belt conveyor.

In an embodiment of the present disclosure, the trolley body is configured to be telescopic to adjust a height of the trolley body.

In an embodiment of the present disclosure, the conveying mechanism includes a linear motor and a guide rail on which the linear motor is mounted.

The embodiments of the disclosure further provides a production line, including at least one line body having a height and an extension direction, and at least one said logistics trolley, wherein the logistics trolley is arranged to be movable along the extension direction of the line body, and the carrier of the logistics trolley is configured to be higher than the line body and transport the material in a direction transverse to the extension direction of the body.

In an embodiment of the disclosure, the at least one said logistics trolley includes one logistics trolley, and the production line includes two line bodies the logistics trolley is disposed therebetween.

In an embodiment of the disclosure, the conveying mechanism of the carrier of the logistics trolley is configured to move the materials on the carrier in a direction transverse to the extension direction of the line body.

In an embodiment of the disclosure, the production line includes one line body at two sides of which one logistics trolley is disposed respectively, the carriers of two said logistics trolleys are arranged oppositely across the line body of the production line.

In an embodiment of the disclosure, the material spans across the carrier of the logistics trolley and maintains stationary relative to said carrier, the two logistics trolleys are arranged to move along the line body of the production line to move the material along the extension direction of the line body.

In an embodiment of the disclosure, the conveying mechanism of the carrier of each logistics trolley is configured to move the material on the carriers of the two logistics trolleys in a direction transverse to the extension direction of the line body.

BRIEF DESCRIPTION OF THE DRAWINGS

The embodiments of the disclosure are illustrated with reference to the drawings.

DETAILED DESCRIPTION

The exemplary embodiments of the present disclosure are described in detail below. The embodiments illustrated below and shown in the accompanying drawings are intended to teach the principle of the present disclosure, so that those skilled in the art can carry out and use the present disclosure in different environments and different applications.

Figure 1:
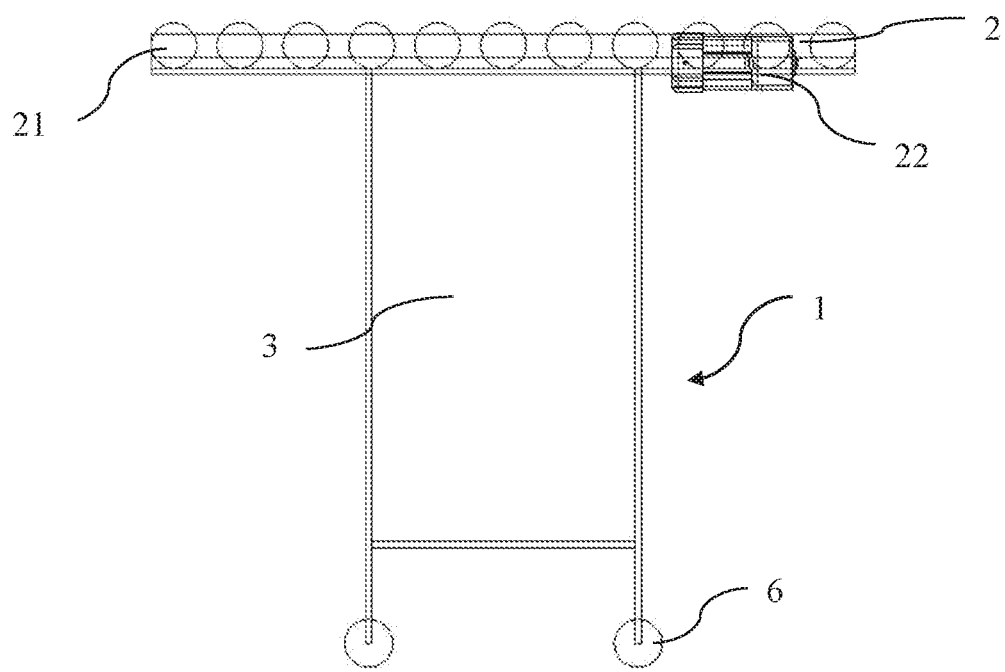
FIG. 1 is a front view of a logistics trolley of an embodiment of the present disclosure.
Figure 2:
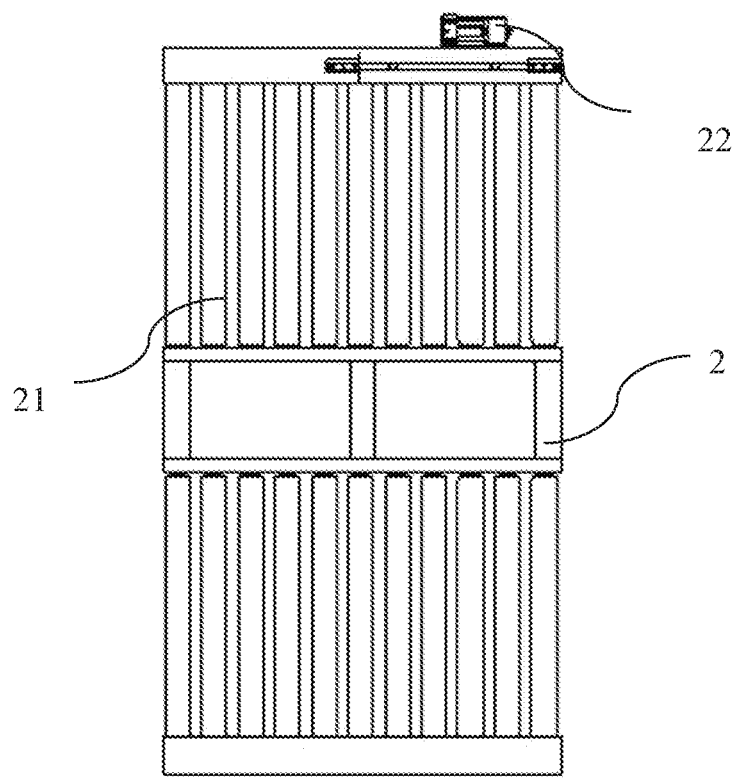
FIG. 2 is a top view of the logistics trolley of FIG. 1.

FIGS. 1 and 2 show a logistics trolley of an embodiment of the disclosure. The logistics trolley 1 includes a carrier 2 for carrying a material 5, a trolley body 3 supporting the carrier 2, and four wheels 6 (only two wheels are shown in the drawings) disposed at the bottom of the trolley body 3.

A dimension of the carrier 2, in particular a width in a transverse direction of the trolley body (generally perpendicular to an extension direction of the line body) may be greater than a width of the trolley body 3. A height of the trolley body 3 is selected such that the carrier 2 is higher than the line body using the logistics trolley 1.

In this case, the trolley body 3 can be designed to have a smaller width depending on a narrow area to pass through, e.g., the width dimension of a passage between two production lines and have a height to enable the carrier 2 to be higher than the line body of the production line, such that the logistics trolley is adapted to be used in narrow areas without a complicated design, in particular to move between the production lines to transport materials of large volume.

The carrier 2 may include a conveying mechanism which may be, for example, a roller transmission mechanism.

By means of the above conveying mechanism, the logistics trolley may move along an extension direction of the line body, and the carrier can transport a material 5 in a direction transverse to the extension direction of the line body, such that the material 5 is movable along a direction transverse to the extension direction of the line body, i.e., the material 5 is movable on the logistics trolley 1 towards or away from the production line. By means of the roller conveying mechanism, the material is movable on the carrier toward the line body of the production line by rolling of the roller.

The conveying mechanism may be a conveyor belt device, e.g., a belt conveyor, or may be a guide rail device, e.g., a guide rail and a linear motor mounted thereon. Other suitable conveying mechanisms are applicable as long as they can move the material in the extension direction transverse to the line body.

The roller conveying mechanism may include a support frame and a plurality of conveying rollers 21 mounted on the support frame, as well as a drive motor 22 for driving the conveying rollers 21.

The drive motor 22 may be provided with a switch (not shown in the drawings) to control a conveying direction of the conveying roller 21, and to achieve bi-directional conveying of the material on the roller conveying mechanism. By this configuration, the material can be transported toward or away from the production line.

The trolley body 3 may be configured to be telescopic to adjust the height of the trolley body.

The four wheels 6 may be universal wheels, by virtue of which the logistics trolley 1 can change directions more flexibly.

Figure 3:
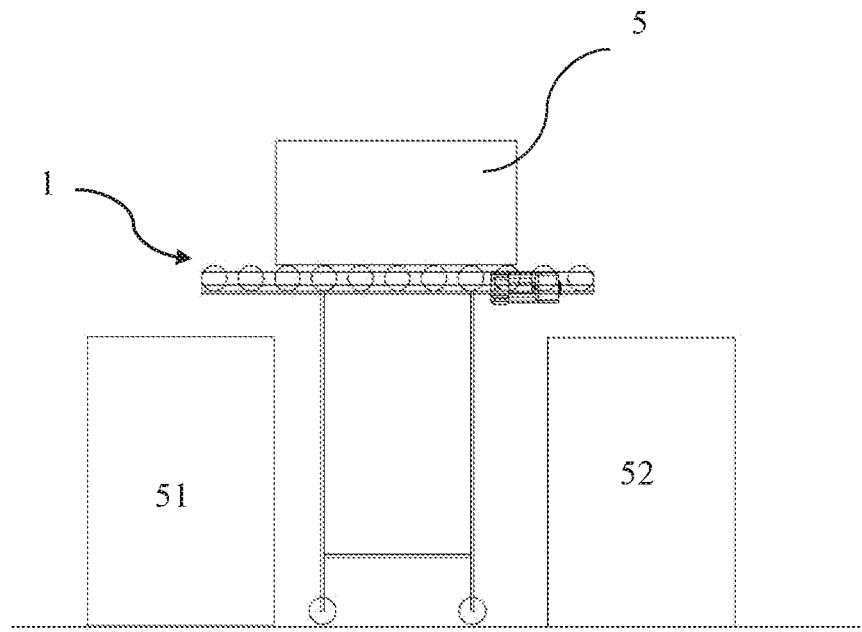
FIG. 3 shows a logistics trolley of an embodiment of the disclosure that moves the materials along a production line.

As shown in FIG. 3, the embodiment of the present disclosure further provides a production line, which includes two line bodies, each of which has a height and an extension direction, and a single logistics trolley 1 which is used to move a material of small volume along the production line.

The logistics trolley 1 may be disposed between two line bodies of the production line, i.e., a first line body 51 and a second line body 52 to move the logistics trolley 1 along the extension direction of the line bodies of the production line. The material 5 to be transported can be placed on the carrier 2 when it is required to be transported such that the material is stationary relative to the carrier 2 and then the logistics trolley 1 is moved along the extension direction of the line bodies to a selected position. When the material is moved to the selected position, the drive motor 22 is started to move the material 5 toward a first line body 51 or a second line body 52 by the conveying roller 21.

Figure 4:
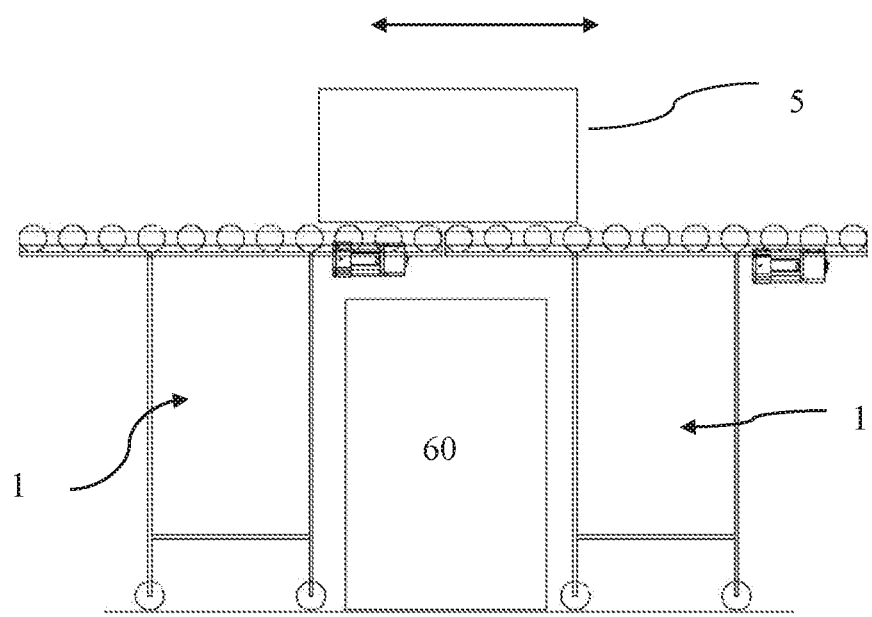
FIG. 4 shows using two logistics trolleys to move the materials along an extension direction transverse to the line body in an embodiment of the disclosure.

As shown in FIG. 4, in an embodiment of the disclosure, the production line includes one line body 60 at two sides of which two logistics trolleys 1 are placed in such a manner that the carriers 2 thereof are disposed oppositely across the line body 60 of the production line so as to place a material of large volume and heavy weight on the two logistics trolleys. As illustrated by FIG. 4, when the material is required to be conveyed across the line body 60 of the production line 60, the drive motor 22 may be started to drive the conveying roller 21 to rotate, thereby moving the material 5 in bi-directional across the line body of the production line.

Figure 5:
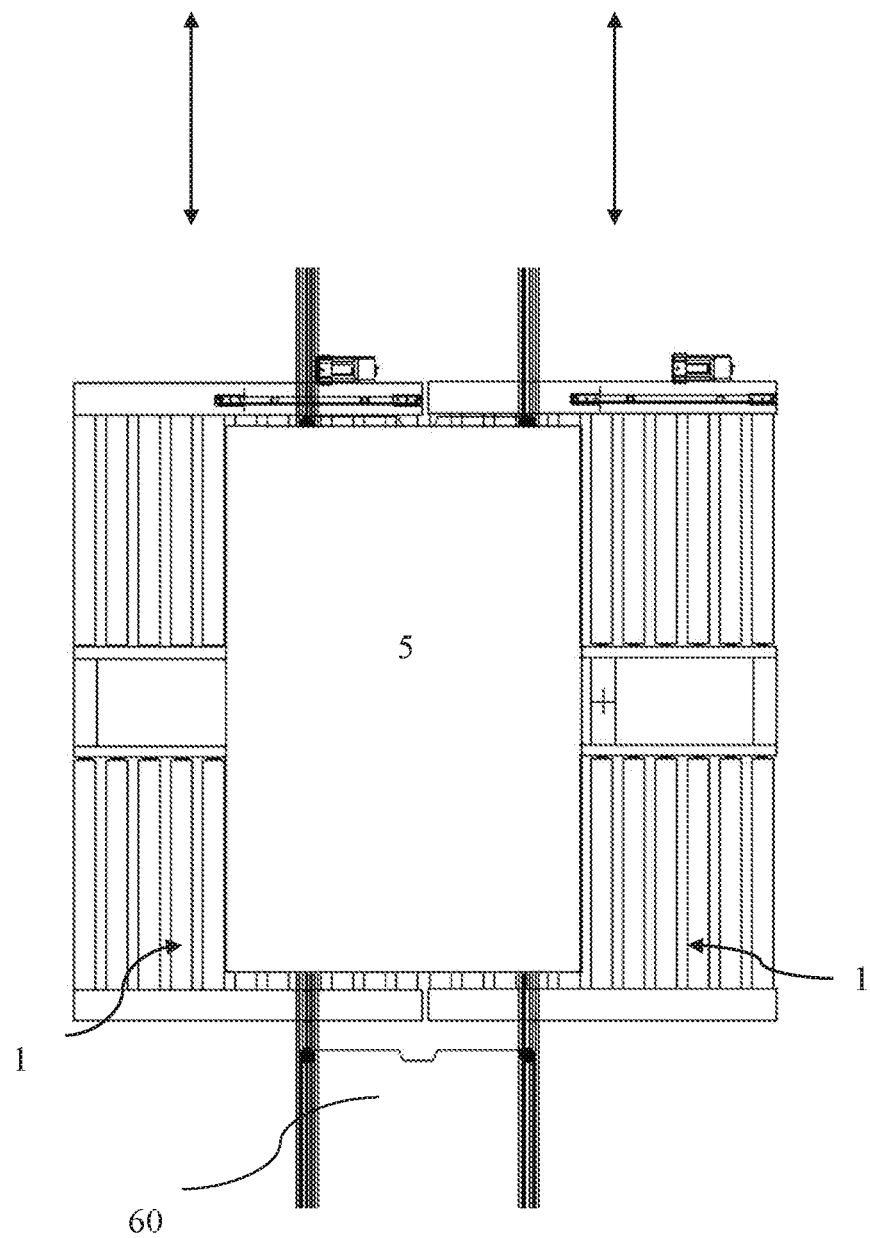
FIG. 5 shows using two logistics trolleys to move the materials along an extension direction of the line body in an embodiment of the disclosure, wherein the material remains stationary relative to the logistics trolley.

As shown in FIG. 5, when the material 5, in particular the material of large volume and heavy weight is required to be moved in the extension direction of the line body of the production line, it can maintain stationary relative to the carriers 2 and span cross the carriers 2 of the two logistics trolleys, and the two logistics trolleys are moved along the line body 60 of the production line to move the material along the extension direction of the line bodies.

The logistics trolley of the present disclosure is applicable to narrow areas, e.g., narrow working environment between the production lines. A single logistics trolley, for example, can move the material of small volume and light weight along the extension direction of the production line. And for example, the material of large volume and heavy weight can be moved by disposing the two logistics trolleys oppositely across the line body of the production line.

It should be noted that the above illustration is only exemplary. Any modifications and variants made to the embodiments of the present disclosure are encompassed within the protection scope of the present disclosure.

What is claimed is:

1. A production line, comprising at least one line body having a height and an extension direction, and at least one logistics trolley, each logistics trolley comprising:
   a carrier for carrying a material;
   a trolley body for supporting the carrier; and
   wheels disposed at the bottom of the trolley body, wherein the carrier has an extension length in a horizontal direction greater than an extension length of the trolley body in a horizontal direction, and wherein the carrier comprises a conveying mechanism for conveying the material;
   wherein the logistics trolley is arranged to be movable along the extension direction of the line body, and wherein the carrier of the logistics trolley is configured to be higher than the line body and transport the material in a direction transverse to the extension direction of the line body; and
   wherein the production line comprises one line body having one logistics trolley disposed at each of two sides, the carriers of the two logistics trolleys arranged oppositely across the line body of the production line.

2. The production line according to claim 1, wherein the material remains stationary relative to the carrier of the logistics trolley and spans across the carrier, the two logistics trolleys arranged to move along the line body of the production line to move the material along the extension direction of the line body.

3. The production line according to claim 1, wherein the conveying mechanism of the carrier of each logistics trolley is configured to move the material on the carrier of the two logistics trolleys in a direction transverse to the extension direction of the line body.

4. The production line according to claim 1, wherein the conveying mechanism comprises a roller conveying mechanism including a support frame and a plurality of rollers mounted on the support frame.

5. The production line according to claim 4, wherein the logistics trolley further comprises a drive motor arranged to drive the roller conveying mechanism to convey the material.

6. The production line according to claim 1, wherein the conveying mechanism comprises a belt conveyor.

7. The production line according to claim 1, wherein the conveying mechanism includes a linear motor and a guide rail on which the linear motor is mounted.

8. The production line according to claim 1, wherein the trolley body is configured to be telescopic to adjust a height of the trolley body.

* * * * *